(12) United States Patent
Tynderfeldt (10) Patent No.: US 7,340,018 B2
(45) Date of Patent: Mar. 4, 2008

(54) DIAGONALLY LAYERED MULTI-ANTENNA TRANSMISSION FOR FREQUENCY SELECTIVE CHANNELS

(75) Inventor: Tobias Tynderfeldt, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 10/509,996

(22) PCT Filed: Mar. 19, 2003

(86) PCT No.: PCT/SE03/00458

§ 371 (c)(1),
(2), (4) Date: Oct. 5, 2004

(87) PCT Pub. No.: WO03/088552

PCT Pub. Date: Oct. 23, 2003

(65) Prior Publication Data

US 2005/0118953 A1    Jun. 2, 2005

(30) Foreign Application Priority Data

Apr. 11, 2002    (SE) ................................. 0201103

(51) Int. Cl.
*H03D 1/06* (2006.01)
(52) U.S. Cl. ............... 375/348; 375/267; 375/347
(58) Field of Classification Search ............. 375/267, 375/269, 275, 347, 348
See application file for complete search history.

(56) References Cited

U.S. PATENT DOCUMENTS

| | | | |
|---|---|---|---|
| 5,799,047 A * | 8/1998 | Dobrica | 375/350 |
| 6,307,883 B1 * | 10/2001 | Kanada et al. | 375/231 |
| 6,314,147 B1 * | 11/2001 | Liang et al. | 375/346 |
| 6,654,429 B1 * | 11/2003 | Li | 375/316 |
| 6,754,294 B1 * | 6/2004 | Adireddy et al. | 375/348 |
| 6,898,248 B1 * | 5/2005 | Elgamal et al. | 375/259 |
| 6,912,250 B1 * | 6/2005 | Adireddy et al. | 375/232 |
| 7,099,299 B2 * | 8/2006 | Liang et al. | 370/342 |
| 2001/0048662 A1 * | 12/2001 | Suzuki et al. | 370/230 |
| 2002/0181509 A1 * | 12/2002 | Mody et al. | 370/480 |
| 2003/0123525 A1 * | 7/2003 | Smee et al. | 375/147 |

(Continued)

FOREIGN PATENT DOCUMENTS

EP    817401    1/1998

(Continued)

OTHER PUBLICATIONS

E. Lindskog and A. Paulraj, "A Transmit Diversity Scheme for Channels with Intersymbol Interference", ICC 2000, Piscataway, NJ, USA, 2000, vol. 1, pp. 307-311.

(Continued)

*Primary Examiner*—David C. Payne
*Assistant Examiner*—Leon-Viet Q Nguyen
(74) *Attorney, Agent, or Firm*—Nixon & Vanderhye P.C.

(57) ABSTRACT

Inter-layer inter-symbol interference is avoided using diagonally layered, Multi-antenna transmissions. Known symbols are inserted at the borders between different layers to avoid inter-layer inter-symbol interference. Multiple data-streams (layers) are transmitted over multiple antennas in an effective and smart way so that inter-layer inter-symbol interference between different data-streams is avoided when changing transmit antenna for the data-streams.

27 Claims, 5 Drawing Sheets

U.S. PATENT DOCUMENTS

| | | | |
|---|---|---|---|
| 2004/0013211 A1* | 1/2004 | Lindskog et al. | 375/347 |
| 2005/0190853 A1* | 9/2005 | Tirkkonen | 375/295 |
| 2006/0115031 A1* | 6/2006 | Lindskog et al. | 375/348 |
| 2006/0176949 A1* | 8/2006 | Allpress et al. | 375/233 |

FOREIGN PATENT DOCUMENTS

| | | |
|---|---|---|
| EP | 1133071 A2 | 9/2001 |

OTHER PUBLICATIONS

G. J. Foschini et al. "Simplified Processing for High Spectral Efficiency Wireless Communication Employing Multi-Element Arrays" IEEE Journal on selected areas in communication, Nov. 1999, vol. 17, No. 11.

ICC '99, vol. 1, Jun. 6-10, 1999, Shiu et al., Layered Space-Time Codes for Wireless Communications Using Multiple Transmit Antennas, p. 436-440.

G. J. Foschini, "Layered Space-Time Architecture for Wireless Communication in a Fading Environment when using Multiple Antennas", Bell-Labs Technical Journal, Autumn 1996, pp. 41-59.

International Search Report.

Foschini et al., "On Limits of Wireless Communications in Fading Environments When Using Multiple Antennas". Wireless Pers. Commun. 1998, 6(3), pp. 311-335.

Wolniansky et al., "V-BLAST: An Architecture for Achieving Very High Data Rates Over the Rich-Scattering Wireless Channel", Proc. ISSSE-98, Pisa, Italy, 1998.

Translation of Chinese official action, Oct. 20, 2006, in corresponding Chinese Application No. 03808191.1.

* cited by examiner

DIAGONALLY LAYERED MULTI-ANTENNA TRANSMISSION FOR FREQUENCY SELECTIVE CHANNELS

This application is the US national phase of international application PCT/SE03/00458 filed in English on 19 Mar. 2003, which designated the US. PCT/SE03/00458 claims priority to SE Application No. 0201103-9 filed 11 Apr. 2002. The entire contents of these applications are incorporated herein by reference.

TECHNICAL FIELD

The present invention relates to mobile cellular communication networks employing multiple access schemes and more exactly to a method of transmitting multiple data streams (layers) from multiple transmitting antennas.

BACKGROUND

Mobile cellular communication networks employ multiple access schemes in which inter-symbol interference (ISI) needs to be combated through equalisation. Obvious embodiments are the TDMA (Time Division Multiple Access) based GSM (Global System for Mobile Telecommunications), now evolving into the enhanced data rates for GSM, GSM/EDGE Radio Access Network (GERAN), and the TD-CDMA (Time Division Code Division Multiple Access) based UTRA-TDD (UMTS Terrestrial Radio Access Time Division Duplex) network. The description below uses GSM terminology as an example, but the invention is not limited to GSM. The invention particularly relates to encoding and decoding of multi-layered signals transmitted over a Multiple-Input Multiple-Output (MIMO) frequency selective channel.

Spectrum has become a limited and expensive resource in mobile cellular radio communication networks. Therefore, much attention is given to improving the spectral efficiency. One method of increasing capacity without an increased bandwidth is to exploit multiple antennas at both transmitter and receiver. The channel between transmitter and receiver is a MIMO channel. Such a MIMO channel does offer a much greater channel capacity compared to a channel with one transmitting and one receiving antenna [1].

Figure 1:
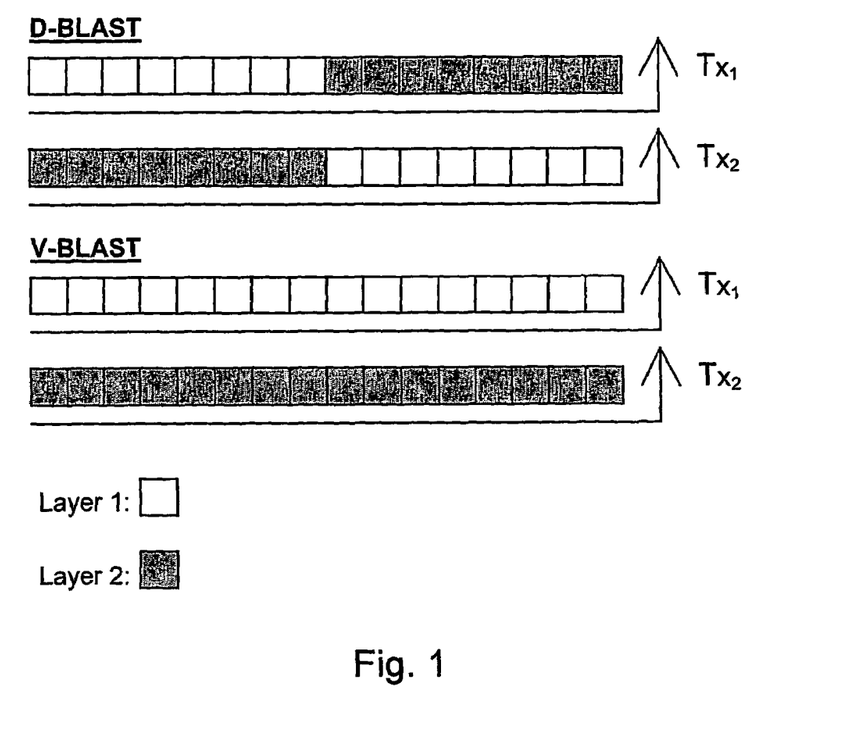
FIG. 1 illustrates D-BLAST and V-BLAST multi-antenna transmission schemes for two transmit antennas wherein data is divided into two independent layers and for D-BLAST an equal number of symbols is transmitted from each antenna, while for V-BLAST each layer is transmitted from only one antenna.

There exist several proposed techniques in which the MIMO channel is exploited to increase capacity. Some of the more attractive techniques for exploiting the MIMO channel are techniques in which data is divided into separate layers being transmitted simultaneously, and where each layer may in the receiver be demodulated and decoded separately from all other layers. A layered space-time architecture for multi-element antenna arrays proposed by G. J. Foschini [2] is now often referred to as BLAST (Bell-Labs Layered Space-Time Architecture), designed for systems with flat fading channels. The BLAST method can be divided into two sub-classes: Diagonal BLAST (D-BLAST) [3] and Vertical BLAST (V-BLAST) [4], which are shown in FIG. 1 for a transmission system with two transmit antennas. In another paper by Foschini et al, [5] it was mentioned that "with diagonal layering, some space-time is wasted at the start and end of each burst." However this does not relate to avoiding problems with ISI when changing transmit antenna for the different layers. Instead they conclude that in the beginning and end of a radio burst there will be a decreased capacity with the coding algorithm and the receiver algorithm they apply.

In D-BLAST a stream of data is de-multiplexed into several sub-streams, or layers of data, each of which may be encoded and mapped onto symbols independently. At a given time each layer is transmitted by a separate antenna. In the transmitter the antenna to which a layer is coupled changes at regular intervals. A position in a burst, where a layer changes transmit antenna, will for simplicity be referred to as a border between two layers. The transmitting antenna of a layer is switched in a cyclic fashion so that each layer is in total transmitted an equal length of time from all antennas. The layers could switch antennas as slowly as is shown in FIG. 1, or as fast as every symbol. This serves to ensure that none of the layers experiences the worst transmission path for a complete burst. If one of the transmission paths is lost due to fading it could still be possible, thanks to the transmission from multiple antennas, to recover the layer through use of an error correcting channel code such as e.g. a convolutional code.

Also for V-BLAST a stream of data is de-multiplexed into several layers of data, each of which may be encoded and modulated independently. As opposed to D-BLAST, each layer is associated to one transmit antenna for the complete burst. This means that, if one transmit antenna is lost due to e.g. fading, a complete layer transmitted from that antenna will be lost.

In the receiver a staged demodulation and decoding is typically considered, where each layer is demodulated and decoded separately. In practice this requires multiple antennas also for the receiver. Typically the number of receive antennas should be at least as large as the number of transmit antennas. This allows the receiver to suppress all layers, except for the desired layer, from the received signals. After a layer has been demodulated and decoded it is cancelled from the received signal. Alternatively, a layer may be cancelled from the received signal directly after demodulation and before decoding. This may be preferable, either if a code with high code rate has been used, or if a layer has been encoded over several transmission bursts, in which case the receiver would need to receive all bursts, over which the layers have been encoded, before demodulation and decoding is to begin.

In a recent U.S. patent [6] a receiver algorithm is described where multiple receiver antennas are utilised to suppress co-channel interference (CCI) and then using a "Viterbi-equalizer" to take care of ISI. However this only relates to a specific receiver algorithm but not any method for the transmission.

For V-BLAST performance is improved if the receiver determines which layer had the best transmission quality, and then demodulates and decodes, alternatively only demodulates, that layer first.

THE PROBLEM TO BE SOLVED

For mobile cellular radio communication networks, which require equalisation in order to combat inter-symbol interference (ISI), e.g. GERAN, problems arise for multi-antenna transmission systems which switch transmit antenna within a burst, e.g. D-BLAST.

Figure 2:
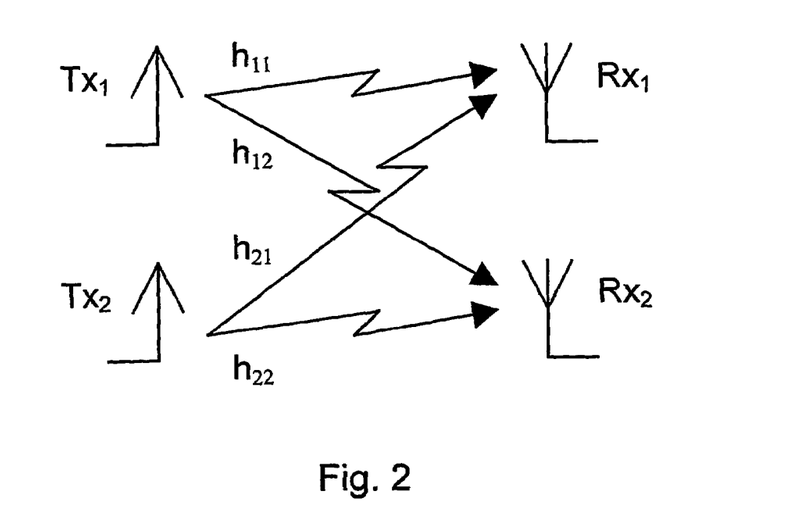
FIG. 2 illustrates propagation paths for a system having two transmit and two receive antennas.

In FIG. 2 the propagation paths for a transmission system with two transmit and two receive antennas are shown. A symbol sequence transmitted from transmit antenna $Tx_1$ is received by receive antenna $Rx_1$ through the channel $h_{11}$ and by $Rx_2$ through $h_{12}$. Similarly, a symbol sequence transmitted from $Tx_2$ reaches $Rx_1$ through $h_{21}$ and $Rx_2$ through $h_{22}$.

If the channels $h_{11}$, $h_{12}$, $h_{21}$ and $h_{22}$ are time-dispersive, the received signals will be corrupted by ISI. To combat the ISI requires equalisation.

Figure 3:
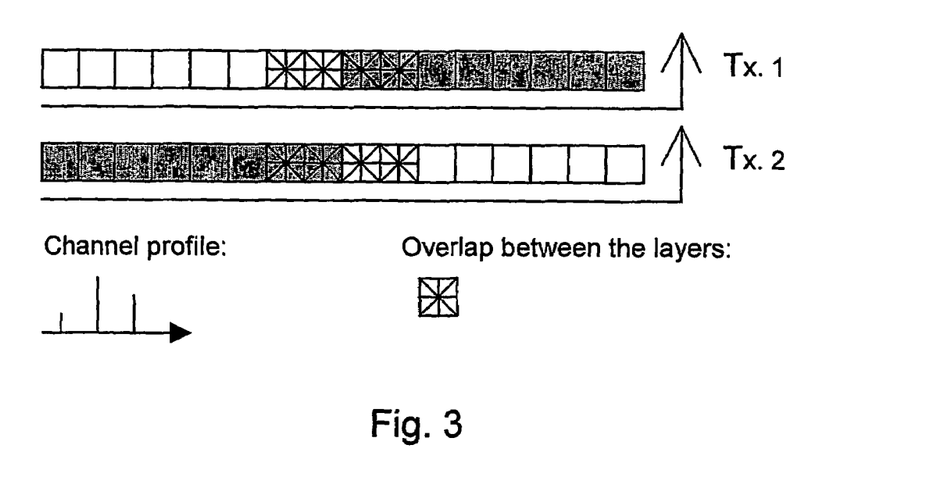
FIG. 3 illustrates D-BLAST for channels with inter-symbol interference where the symbols of each layer affected by inter-layer ISI are marked and for a 3-tap channel, two symbols to either side of the border are affected.

For multi-antenna transmission systems which transmit layers from several transmit antennas, the symbols in a layer closest to the border to another layer are corrupted by ISI, not only from symbols in the same layer, but also from symbols in the adjacent layer. The ISI from an adjacent layer will for simplicity be labelled inter-layer inter-symbol interference (inter-layer ISI). This problem is illustrated in FIG. 3 for two-layered D-BLAST transmitted through 3-tap channels (channels with a memory of two symbols). Two symbols to either side of the border between the two layers are corrupted by inter-layer ISI. Areas in FIG. 3 marked as "overlap between layers" indicate symbols affected by inter-layer inter-symbol interference. This makes it difficult for a receiver which successively demodulates and decodes the layers, since for good equaliser performance, the symbols from the second layer also need to be considered when the first layer is equalised.

For a V-BLAST like solution ISI causes no particular problem since each layer is transmitted from the same transmit antenna for a complete burst. However, V-BLAST like transmission schemes do not offer any transmit diversity, since each layer is transmitted from only one antenna.

SUMMARY OF THE INVENTION

A method and a system for avoiding inter-layer inter-symbol interference are disclosed. The method and system utilise diagonally layered multi-antenna transmission. Known symbols are inserted at the borders between different layers to avoid inter-layer inter-symbol interference. The system relies on a new method to transmit multiple data-streams (layers). The invention describes a method for transmitting data-streams over multiple antennas in an efficient, cost effective and powerful way when having frequency selective channels. By using the present method problems with inter-layer ISI between different data-streams can be avoided when changing transmit antenna for the data-streams. The invention utilises diagonal layered multi-antenna transmission causing no ISI between different layers.

The known symbols, which are inserted at the borders between different layers may be used for purposes such as for instance channel estimation. The known symbols may constitute a training sequence. Typically for a system having a first and a second transmit antenna, and a burst structure containing a training sequence in the middle of a burst and with data fields to either side of the training sequence, such as e.g. GSM and UTRA/TDD do, this burst structure can be exploited for the diagonal layering. On the first transmit antenna a layer one is transmitted in the left data field and a layer two is transmitted in the right data field, while on the second antenna the layer two is transmitted in the left data field and the layer one is transmitted in the right data field thereby separating the two layers by the known training sequence which avoids inter-layer ISI, without having to reduce the number of data symbols that are transmitted.

SHORT DESCRIPTION OF THE DRAWINGS

The invention, together with further objects and advantages thereof, may best be understood by making reference to the following description taken together with the accompanying drawings, in which.

DETAILED DESCRIPTION

A diagonally layered multi-antenna transmission scheme like D-BLAST has a greater capacity potential than a V-BLAST like scheme due to transmission from several transmit antennas for each layer, as opposed to transmission from only one antenna for each layer. This invention then allows diagonally layered multi-antenna transmission schemes to be employed also for communication networks suffering from ISI, without causing inter-layer ISI.

Figure 4:
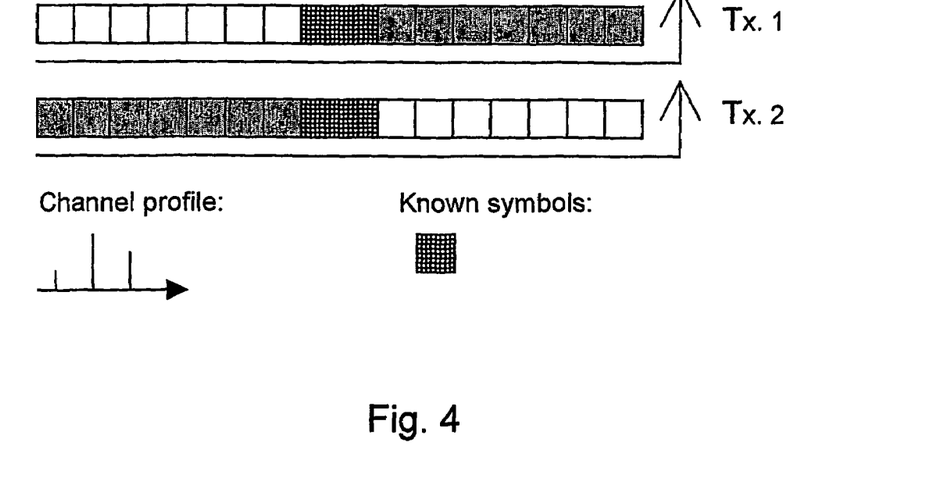
FIG. 4 illustrates a diagonally layered 2-antenna transmission scheme suited for channels with inter-symbol interference whereby known symbols are inserted at the border between the two layers in order to avoid inter-layer ISI and for 3-tap channels two known symbols for each transmit antenna is sufficient.

The inter-layer ISI can be avoided by inserting known symbols into the sequence transmitted from each antenna at every border between different layers (see FIG. 4). If the number of known symbols is at least as large as the channel memory (the number of channel taps minus one) there will be no ISI between different layers. This means that the amount of user data that can be transmitted will be reduced, since the number of data symbols is reduced. However, the known symbols could be used also for other purposes such as e.g. channel estimation and synchronisation.

Figure 5:
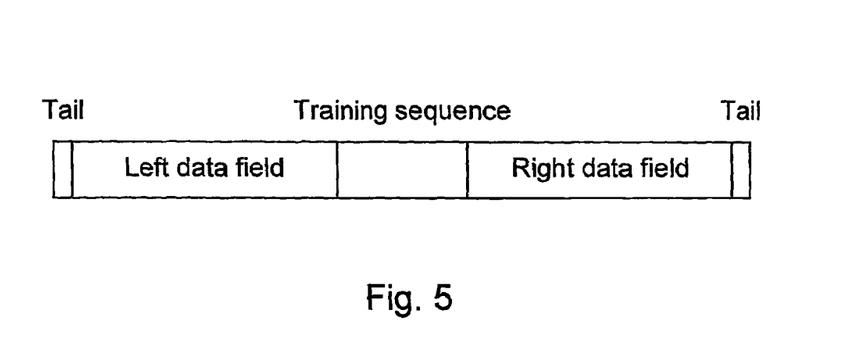
FIG. 5 illustrates GSM radio burst.

For the special case of two transmit antennas the burst structure employed in e.g. GSM and UTRA/TDD can be exploited. In those networks a burst consists of two fields of data separated by a training sequence of known symbols used for e.g. channel estimation (see FIG. 5). For this case, from the first transmit antenna the first layer is transmitted in the data field to the left of the training sequence, and the second layer is transmitted in the data field to the right of the training sequence. From the other transmit antenna the second layer is transmitted in the left data field and the first layer in the right field. As the training sequence is longer than the channel impulse responses there will be no inter-layer ISI. By exploiting an existing burst structure inter-layer ISI can be avoided for a diagonally layered multi-antenna transmission scheme without having to reduce the number of data symbols that are transmitted.

Lindskog and Paulraj [7] present a space-time block code for two transmit antennas. As code block for the space-time block-code, they define a radio burst, where the left data field is one symbol in the space-time block-code and the right data field the second space-time block-coding symbol. These two space-time block-coding symbols are transmitted from both transmit antennas and are separated in time by the training sequence. In contrast to the approach described above where multiple layers of independent data provides increased bit rates, the method of Lindskog and Paulraj transmits the same data on both transmit antennas, and therefore does not offer increased bit rates, only increased diversity. Further, by using the training sequence to separate the space-time block coding symbols, orthogonality within the space-time code block is ensured, which enables a low complexity decoding of the space-time code. In contrast, the approach described above allows separate detection of each of the multiple layers.

Figure 6:
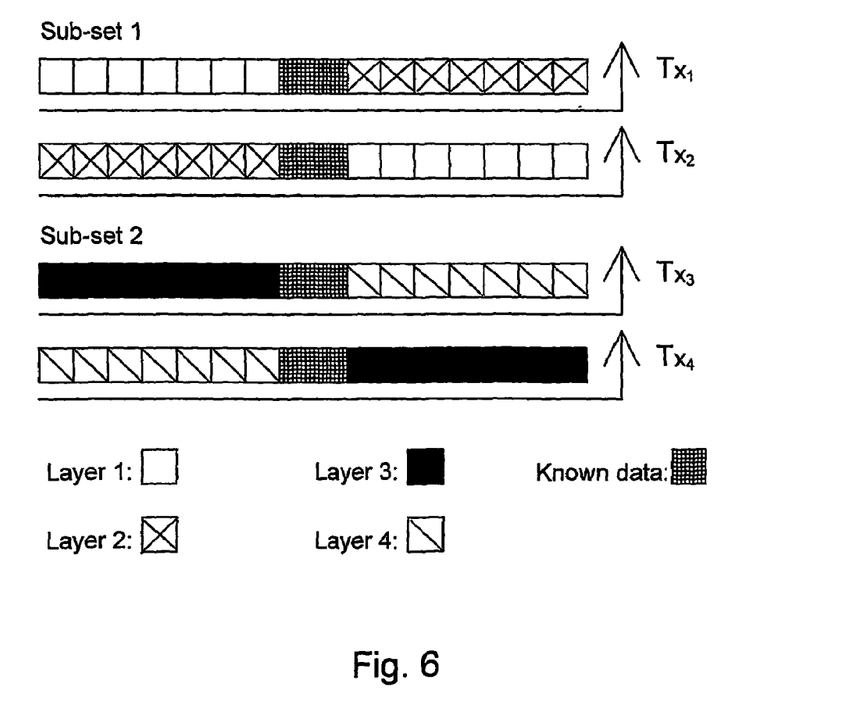
FIG. 6 shows a 4-antenna transmission where the transmit antennas are divided into two sub-sets, with two transmit antennas within each sub-set and diagonal layering is employed within each sub-set.

For diagonally layered multi-antenna transmission in case of ISI with more than two transmit antennas, layering over all antennas may require transmission of quite a lot of known symbols. An alternative approach would be to divide both the transmit antennas and the layers into sub-sets, each sub-set containing a number of transmit antennas and the corresponding sub-set of layers containing a number of layers equal to the number of transmit antennas. Within each sub-set the layers are layered diagonally across the transmit antennas. This is shown for the special case of two antennas within a sub-set in FIG. 4, where the two layers within a subset are separated by known symbols. However, there is no layering across antennas belonging to different sub-sets. This is shown in FIG. 6 for a 4-antenna transmission scheme. In a further application it would additionally be possible to use more than two antennas for a sub-set, even if we for simplicity here consider embodiments having just two antennas for a sub-set. It would also be possible to consider having different number of antennas, and thus also different number of layers, in different sub-sets. The division of antennas and layers into sub-sets could be changed dynamically as often as every radio burst, and different sub-set division could be allowed for different users.

Using the diagonally layered multi-antenna transmission scheme described above, inter-symbol interference (ISI) between different layers is avoided. This allows the receiver to demodulate and decode the layers sequentially. A complete layer is demodulated (including equalisation) and decoded, before it is cancelled from the received signal. Thereafter the next layer is demodulated and decoded, and so forth. Using diagonal layering without consideration of ISI between layers the receiver will not be able to demodulate and decode a complete layer before cancelling it. In this case the complete sequence of symbols transmitted from one antenna would have to be demodulated and cancelled. This means that only parts of each layer is demodulated before cancellation, which is performed before decoding. Being able to perform decoding before cancellation reduces the amount of errors, and thus the effect of error propagation, which may occur when a cancelled layer contains estimation errors.

The alternative is to use a V-BLAST like multi-antenna transmission scheme where there is no risk of inter-layer ISI. However, transmit diversity, which improves performance, in particular for layers onto which low rate channel codes have been applied, is not provided with such a scheme. Further, for good performance in a V-BLAST like multi-antenna transmission scheme it is important to determine which layer has experienced the best transmission quality, and to begin with this layer. This is not necessary for the diagonally layered multi-antenna transmission scheme, since all layers are transmitted equally over all transmit antennas. This means that additional gains could be achieved if different code rates are used for the different layers. The layer being demodulated and decoded first could be given a lower code rate, since this layer gains the least from diversity. By improving this layer, performance of subsequent layers may also improve. However, it should be pointed out, that the method will not be limited to any particular receiver algorithm.

Figure 7:
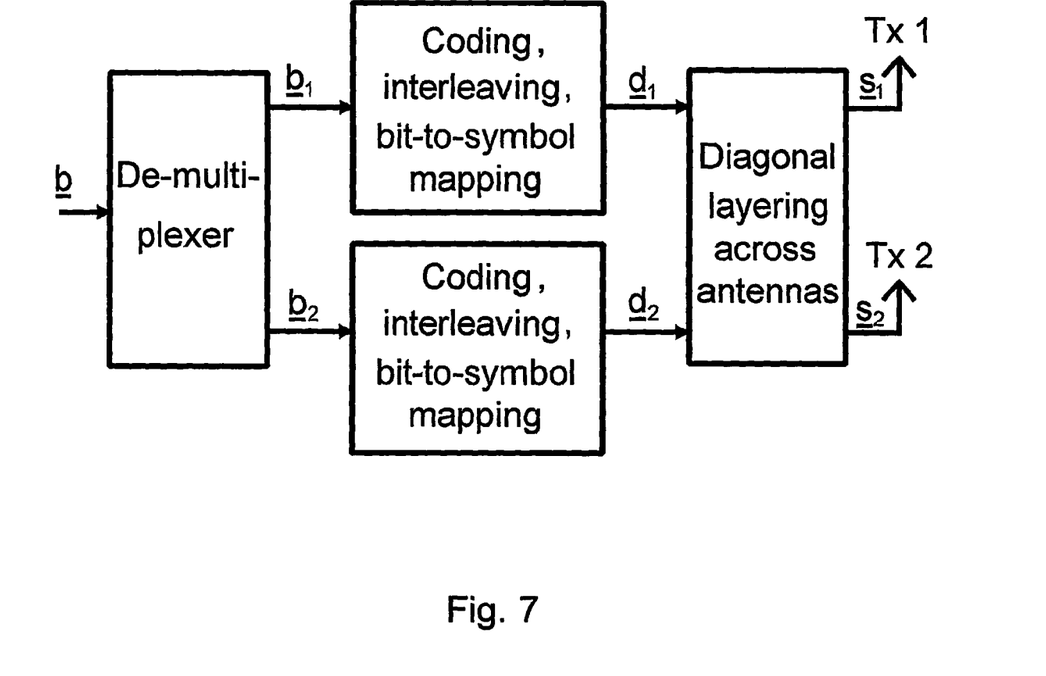
FIG. 7 illustrates an exemplary base-band block diagram for the transmitter.

FIG. 7 illustrates in a simplified base-band block diagram an exemplary illustrative embodiment of a diagonally layered multi-antenna transmission scheme, where a data stream is de-multiplexed into two individual layers, each of which is independently coded, interleaved and mapped onto symbols. Thereafter the layers are mapped onto the two transmit antennas according to the diagonal layering method.

Figure 8:
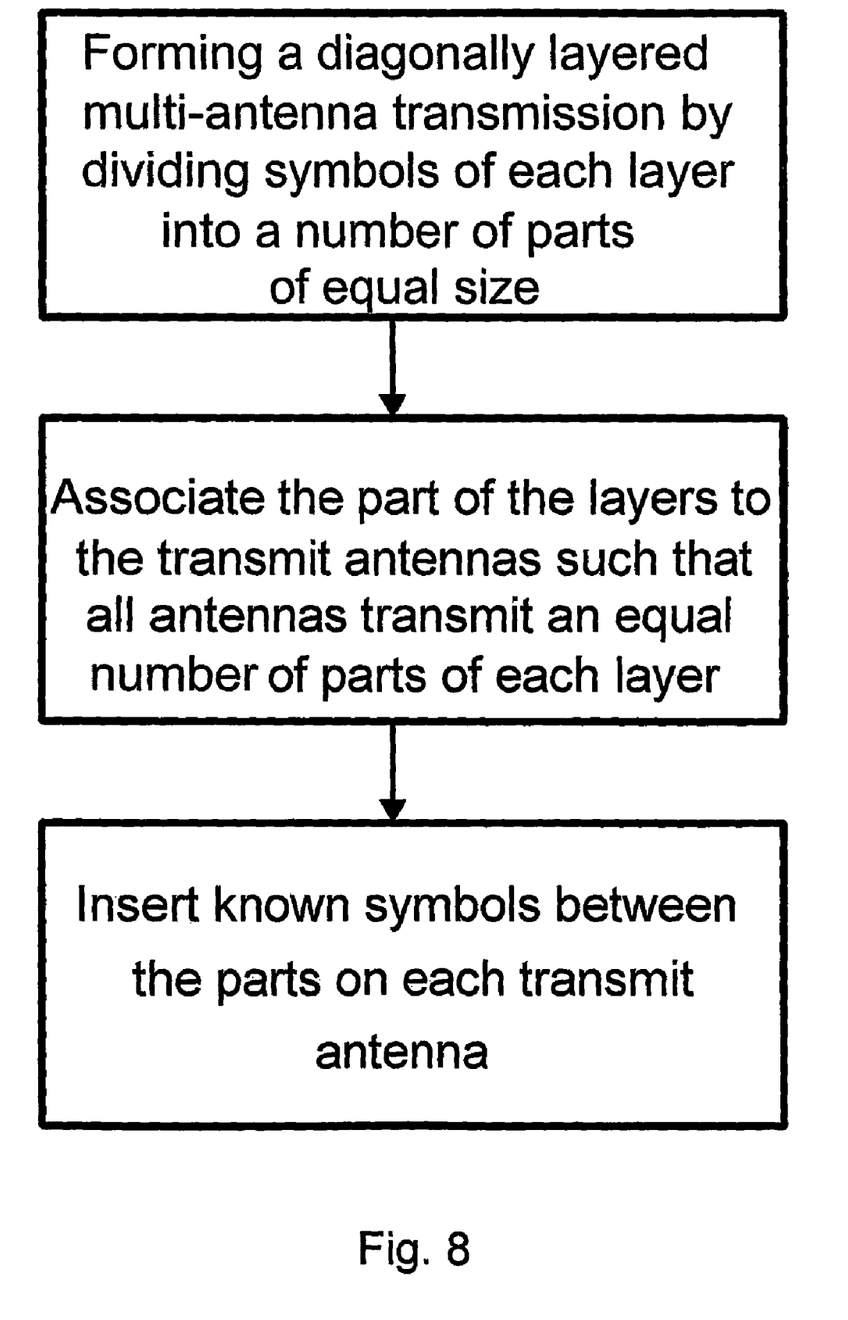
FIG. 8 illustrates in a diagram the main steps according to the present method.

FIG. 8 illustrates in a diagram the main steps for forming a diagonally layered multi-antenna transmission according to the present method disclosed.

It will be understood by those skilled in the art that various modifications and changes may be made to the present invention without departing from the spirit and the scope thereof, which is defined by the appended claims.

REFERENCES

[1] G. J. Foschini and M. J. Gans, "On limits of Wireless Communications in Fading Environments when using Multiple Antennas", Wireless Pers. Commun. 1998, 6(3), pp 311-335

[2] EP-817401, by G. J. Foschini, "Wireless communications system having a layered space-time architecture employing multi-element antennas", 1998

[3] G. J. Foschini, "Layered Space-Time Architecture for Wireless Communication in a Fading Environment when using Multiple Antennas", Bell-Labs Technical Journal, Autumn 1996, pp. 41-59.

[4] P. W. Wolniansky, G. J. Foschini, G. D. Golden and R. A. Valenzuela, "V-BLAST: An Architecture for Achieving Very High Data Rates over the Rich-Scattering Wireless Channel", Proc. ISSSE-98, Pisa, Italy, 1998.

[5] G. J. Foschini et al. "Simplified Processing for High Spectral Efficiency Wireless Communication Employing Multi-Element Arrays" IEEE Journal on selected areas in communication, Nov. 1999, Vol. 17, No. 11.

[6] U.S. Pat. No. 6,314,147 by Liang et al., "Two-Stage CCI/ISI Reduction with Space-Time Processing in TDMA Cellular Networks", 2001.

[7] E. Lindskog and A. Paulraj, "A Transmit Diversity Scheme for Channels with Intersymbol Interference", ICC 2000, Piscataway, N.J., USA, 2000, vol. 1, pp. 307-11.

The invention claimed is:

1. A method for avoiding inter-layer inter-symbol interference, comprising:
   using a diagonally layered multi-antenna transmission utilizing a number of multiple layers, each layer including a different sequence of symbols;
   dividing the different sequence of symbols of each layer into a first number of multiple sub-sequences, the first number being a multiple of the number of multiple layers, where the multiple sub-sequences in each of the layers include non-identical information content;
   associating the multiple sub-sequences to a second number of transmit antennas such that all antennas transmit an equal number of sub-sequences of each layer; and inserting known symbols between each of the multiple sub-sequences to each transmit antenna, a number of known symbols being at least as many as a number of symbol spaced channel taps minus one seen by a receiver to avoid inter-layer inter-symbol interference.

2. The method according to claim 1, further comprising: inserting the number of known symbols at the border between the multiple sub-sequences of the different layers with at least as many as an expected channel memory for a channel observed by a receiver.

3. The method according to claim 2, further comprising: inserting the known symbols at the borders between the different layers, and using inserted known symbols for channel estimation or similar purposes.

4. The method according to claim 3, wherein the first number of multiple sub-sequences of the layers are equal in size.

5. The method according to claim 4, wherein the known symbols constitute a training sequence.

6. The method according to claim 5, wherein in a system having a first and a second transmit antenna, and a burst structure containing a training sequence in the middle of a burst and with data fields to either side of the training sequence, the method further comprises:

transmitting a layer one in a left data field and a layer two in a right data field from the first antenna, while transmitting from the second antenna the layer two in the left data field and the layer one in the right data field and from each antenna separating the two layers by the known training sequence to thereby avoid inter-layer inter-symbol interference.

7. The method according to claim 1, further comprising: adaptively changing a transmitter algorithm used between layering over one or several antennas depending on a modulation scheme; and/or a code rate of an outer channel code.

8. The method according to claim 1, further comprising: dividing a transmit antenna array into sub-sets of transmit antennas, each sub-set containing an arbitrary number of transmit antennas;

dividing the layers into sub-sets of layers, each sub-set of layers corresponding to a sub-set of transmit antennas; and diagonally layering the layers within a sub-set, while not permitting layering across different transmit antenna sub-sets.

9. The method according to claim 1, further comprising: setting up a transmit antenna arrangement constituting an even number of individual antennas, the transmit antenna arrangement being divided into sub-sets of two individual antennas, whereby the layers within a sub-set data are diagonally layered, while not permitting layering across different antenna sub-sets.

10. A system for avoiding inter-layer inter-symbol interference, comprising:

a diagonally layered multi-antenna transmission apparatus including a number of multiple layers, each layer including a different sequence of symbols;

means for dividing the different sequence of symbols of each layer into a first number of multiple sub-sequences of layers, the first number being a multiple of the number of multiple layers, where the multiple sub-sequences in each of the layers include non-identical information content;

means for associating the multiple sub-sequences of layers with a second number of transmit antennas such that all antennas are configured to transmit an equal number of multiple sub-sequences of each layer;

means for inserting known symbols at the borders between the multiple sub-sequences to each transmit antenna, a number of known symbols being at least as many as a number of symbol-spaced channel taps minus one as seen by a receiver to avoid inter-symbol interference between the layers.

11. The system according to claim 10, wherein the number of known symbols inserted at the border between the different layers is at least as many as an expected channel memory for a channel observed by a receiver.

12. The system according to claim 11, wherein the known symbols inserted at the borders between the different layers can also be used for channel estimation or other desired purposes.

13. The system according to claim 12, wherein the first number of parts of layers have an equal size.

14. The system according to claim 13, wherein the known symbols constitute a training sequence.

15. The system according to claim 14, wherein for a system having a first and a second transmit antenna, and a burst structure containing a training sequence in the middle of a burst and with data fields to either side of the training sequence, a layer one is transmitted in a left data field and a layer two is transmitted in a right data field of the first antenna, while for the second antenna the layer two is transmitted in the left data field and the layer one is transmitted in the right data field thereby separating the two layers by the known training sequence to thereby avoid inter-layer inter-symbol interference.

16. The system according to claim 10, further comprising a transmitter configured to adaptively change between layering over one or several antennas depending on a modulation scheme and/or a code rate of an outer channel code.

17. The system according to claim 10, further comprising: means for dividing a transmit antenna array into sub-sets of transmit antennas, each sub-set containing an arbitrary number of transmit antennas, where the layers are divided into sub-sets of layers, each sub-set of layers corresponding to a sub-set of transmit antennas, and the layers within a sub-set are diagonally layered while not permitting layering across different transmit antenna sub-sets.

18. The system according to claim 10, further comprising a transmit antenna arrangement including an even number of individual antennas, the transmit antenna arrangement being divided into sub-sets of two individual antennas, where the layers within a sub-set data are diagonally layered, while there is no layering across different antenna sub-sets.

19. The method according to claim 1, wherein each sequence of symbols is divided by separating the symbols into the first number of multiple sub-sequences and introducing the known symbols at the border between the multiple sub-sequences of the different layers.

20. The system according to claim 10, wherein the means for dividing is configured to divide each sequence of symbols by separating the symbols into the first number of multiple sub-sequences and introducing the known symbols at the border between the multiple sub-sequences of the different layers.

21. Apparatus for avoiding inter-layer inter-symbol interference, comprising:

a diagonally-layered, multi-antenna transmitter including a number of multiple layers, each layer including a different sequence of symbols, wherein the different sequence of symbols corresponding to each layer is divided into a first number of multiple sub-sequences of layers, the first number of multiple sub-sequences of layers being a multiple of the number of multiple layers, where the multiple sub-sequences in each of the layers include non-identical information content, electronic circuitry configured to:

associate the multiple sub-sequences of layers to a second number of transmit antennas such that all antennas transmit an equal number of multiple sub-sequences of each layer, and insert known symbols between each of the multiple sub-sequences to each transmit antenna, a number of known symbols being at least as many as a number of symbol spaced channel taps minus one seen by a receiver to avoid inter-layer inter-symbol interference.

22. The apparatus according to claim 21, wherein the electronic circuitry is configured to insert the number of known symbols at a border between the multiple sub-sequences of the different layers.

23. The apparatus according to claim 22, wherein the electronic circuitry is configured to insert the known symbols at the borders between the different layers.

24. The apparatus according to claim 21, wherein the known symbols constitute a training sequence.

25. The apparatus according to claim 24, wherein the diagonally-layered, multi-antenna transmitter includes a first antenna and a second transmit antenna, wherein a data transmission format includes a burst structure having a training sequence in the middle of a burst and with data fields to either side of the training sequence, wherein the diagonally-layered, multi-antenna transmitter is configured to transmit a first layer in a left data field and a second layer in a right data field from the first antenna and to transmit from the second antenna the second layer in the left data field and the first layer in the right data field such that the first and second layers transmitted from each antenna are separated by the known training sequence to avoid inter-layer inter-symbol interference.

26. The apparatus according to claim 21, wherein the electronic circuitry is configured to:

divide a transmit antenna array into sub-sets of transmit antennas, each sub-set containing a number of transmit antennas;

divide the layers into sub-sets of layers, each sub-set of layers corresponding to a sub-set of transmit antennas; and diagonally layer the layers within a sub-set without layering across different transmit antenna sub-sets.

27. The apparatus according to claim 21, wherein the electronic circuitry is configured to divide each sequence of symbols by separating the symbols into the first number of multiple sub-sequences of layers and introducing the known symbols at the border between the multiple sub-sequences of the different layers.

* * * * *